United States Patent Office 2,758,658
Patented Aug. 14, 1956

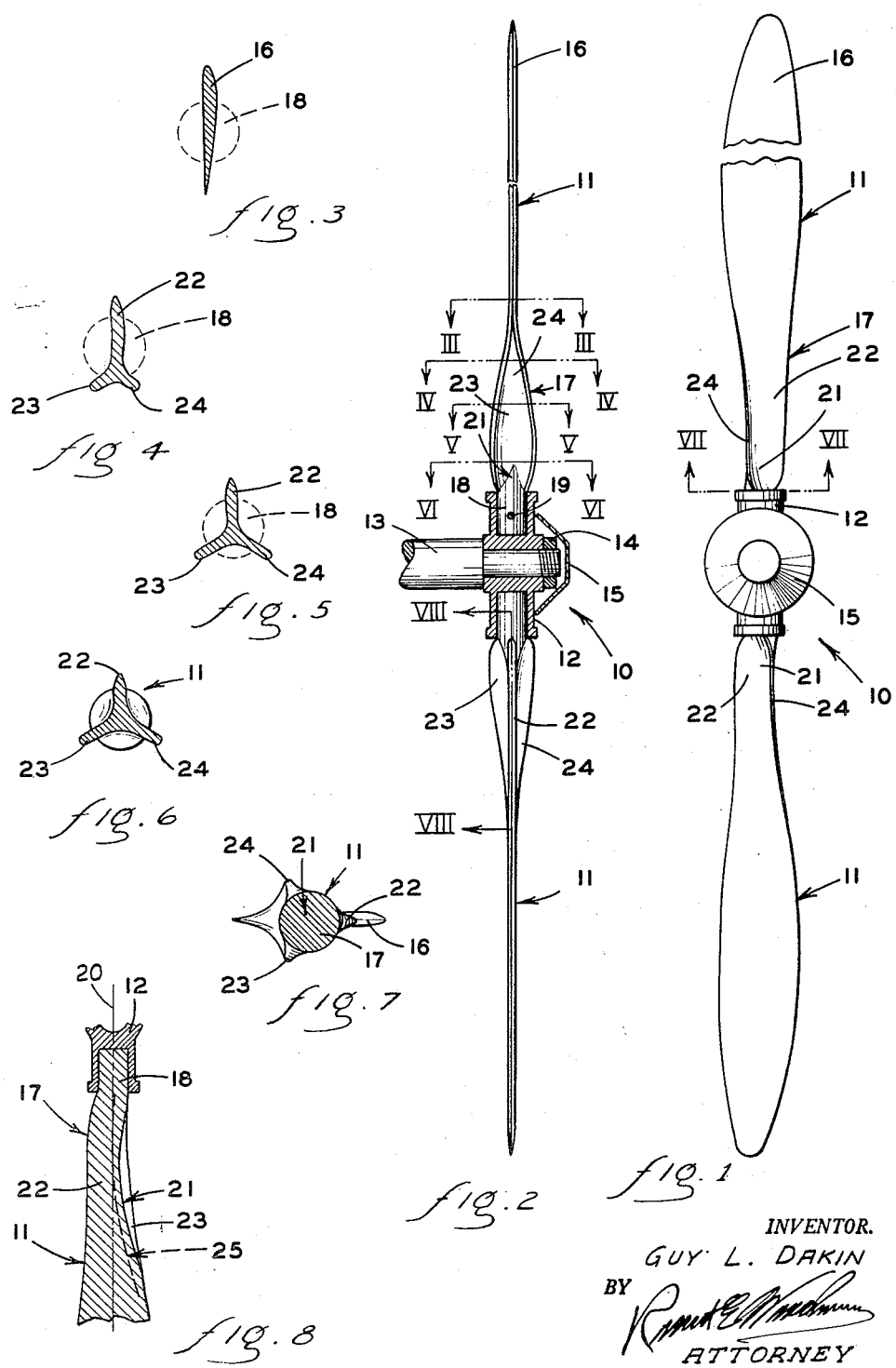

2,758,658

PROPELLER BLADE SHANK

Guy L. Dakin, Dansville, Mich.

Application July 9, 1954, Serial No. 442,238

8 Claims. (Cl. 170—159)

This invention relates in general to an axial flow propeller and more particularly to a propeller blade having a shank structure which will materially improve the efficiency of the propeller, especially at high tip speeds.

This application is a continuation-in-part of my application Serial Number 300,546, filed July 23, 1952, now abandoned.

It is well settled that vibration in a propeller blade, which increases with tip speed, reduces the efficiency of the propeller. Present propeller blade constructions have been made about as rigid as possible where a cylindrical blade shank and conventional materials are used. Any improvement in present propeller constructions must, therefore, depend largely upon the type of materials used therein, unless the propeller structure itself is modified. Only minor structural changes have been made in recent years and these changes have not been concerned with the blade shank. This lack of interest in the shank is largely due to the fact that said shank has been considered a mere connector between the thrust producing, blade portion of the propeller and the propeller hub.

The blade shank, particularly in fixed pitch propellers, is cylindrical primarily as a matter of convenience. The rotational speed of a large propeller, especially, is limited very materially by its centrifugal force and tip speed. As a result, the blade shank generally rotates at a relatively slow speed. Consequently, moderate alterations in the cross-sectional contour of the shank portion will not materially affect the propeller thrust and will not materially increase its resistance to rotation.

Having reached these conclusions, and as a result of them, I realized that the blade shank might be advantageously designed to serve some additional function, such as reducing vibrations in said blade by increasing the rigidity thereof. The cylindrical shank construction is best suited to produce strength commensurate with a minimum cross-section to overcome the usual stretching and torsional stresses encountered. However, such construction is but poorly suited to resist vibration. I have been unable to find that any attempt has been made, particularly in metal propellers having a hub and separable blades, to alter the shank structure for additional utilization.

Accordingly, a primary object of this invention is the provision of a propeller having a shank portion which materially increases the rigidity of the entire blade without decreasing the strength or thrust of the propeller or materially increasing the resistance to rotation of the propeller.

A further object of this invention is the provision of a propeller shank, as aforesaid, wherein the cross-sectional area of said shank does not exceed that of a conventional cylindrical shank whereas the strength required to overcome centrifugal force is maintained and the resistance of the shank to vibration and/or undesired flexion is substantially increased.

Other objects and purposes of this invention will become apparent to persons familiar with this type of equipment upon reading the following specification and examining the accompanying drawings, in which:

Figure 1 is a broken front elevation view of a propeller assembly embodying my invention.

Figure 2 is a side elevation view of said propeller assembly with the hub thereof in central cross-section.

Figure 3 is a sectional view taken along the line III—III of Figure 2.

Figure 4 is a sectional view taken along the line IV—IV of Figure 2.

Figure 5 is a sectional view taken along the line V—V of Figure 2.

Figure 6 is a sectional view taken along the line VI—VI of Figure 2.

Figure 7 is a sectional view taken along the line VII—VII of Figure 1.

Figure 8 is a sectional view taken along the line VIII—VIII of Figure 2.

In meeting the objects set forth above, as well as others related thereto, I have provided a propeller blade having a conventional outer thrust or blade portion and an inner shank portion integral with said blade or thrust portion. A connector is secured to the inner end of the shank portion of said propeller blade for connection thereof to the conventional hub mounted upon a propeller shaft. The shank portion of the propeller blade has a core from which three fins extend radially and lengthwise of said core. In the preferred embodiment of the invention, said fins are disposed equidistant from each other about the axis of said core, and the axis of said core is disposed at an angle to the longitudinal axis of the propeller blade.

Construction

As shown in Figures 1 and 2, the propeller assembly 10 is comprised of a pair of propeller blades 11 which are substantially identical and both embody my invention. A hub 12 supports said blades 11 in a substantially conventional manner upon the propeller shaft 13. It will be recognized that three or four bladed assemblies are fully contemplated by such disclosure. The hub 12 is secured upon the propeller shaft 13 by means of a lock nut 14 or similar device and covered on its forward face by a spinner 15 in a conventional manner.

Each propeller blade 11 has a blade or thrust portion 16 which may be substantially conventional in shape and cross-sectional contour, as shown in Figures 1, 2, and 3. Secured to the inner end of said thrust portion 16 is a shank 17 (Figures 1, 2, and 7) which comprises the substance of my invention. On the inner end of said shank 17, remote from the thrust portion 16, there may be provided in the case of a separable hub 12, a connector 18. In this particular embodiment, said connector 18 is cylindrical in shape for reception into a similar cylindrical opening in the hub 12 and held therein by the connector pin 19.

The shank 17 has a central, longitudinal core 21 which extends from the thrust portion 16 to the connector 18. Three fins 22, 23 and 24 extend radially from said core 21, as best shown by Figures 4, 5, 6, and 7.

As indicated by the dotted line 25 in Figure 8, and the shifting position of the connector 18 in Figures 3, 4, and 5, the center line 25 of the core 21 is disposed at an angle to the lengthwise axis 20 of the propeller blade 11, which axis is coincident with the axis of the cylindrical connector 18. It will be observed that the inner end of the center line 25 of the core 21 intersects the axis of the propeller blade 11 near the junction of the shank 17 and said connector 18. The outer end of the center line 25 is substantially displaced from the axis of said propeller blade 11 toward the trailing edge of the blade at the junction of the shank 17 and thrust portion 16. This particular construction permits the trailing fins 23 and 24 to be reduced in radial extent from the core 21 as said core approaches the thrust portion 16 so that they smoothly blend into the contour of said thrust portion 16 at about the point where Figure 3 is taken. This particular point (Figure 3) corresponds to the normal point where a conventional, cylindrical shank blends with the thrust portion of its blade. Normally, where said cylindrical shank is used, it is of the same diameter as the connector portion 18. Thus, as shown in Figures 6 and 7, it is apparent that the fins 22, 23 and 24 may extend radially substantially beyond the normal diameter of the conventional cylindrical shank, without any increase in cross-sectional area. The construction of the two trailing fins 23, 24, blending together and following through into the trailing edge of the thrust portion 16 of the blade, thus forms a V-shaped stabilising, or bracing element or structure built into the back of the blade.

The fin 22 which blends into, and becomes the leading edge of, the blade or thrust portion 16 is substantially coplanar with said thrust portion 16, as clearly shown in Figures 4 and 5. It is evident in Figures 6, where the centrifugal forces involved permit, the cross sectional area of the shank 17 may be substantially less than the cross sectional area of the connector 18, which would normally be the cross sectional area of a conventional cylindrical shank. It will also be observed that since the leading edge of the fin 22 is coextensive with at least a portion of the leading edge of the propeller thrust portion 16, there is a substantial streamlining effect produced by my shank structure.

Thus, any disadvantage in the fact that the shank 17 adjacent the hub 12 (Figures 6 and 7) is substantially wider than the conventional shank would be, is adequately compensated for by the cutting effect produced by the leading fin 22. Furthermore, it will be observed that the trailing fins 23 and 24 are disposed at an angle to the plane perpendicular to the path of rotation, thereby additionally reducing any disadvantageous effects from the shank design of this invention. Although the trailing fins 23 and 24 are shown as being disposed upon the core 21 approximately 180 degrees from the leading fin 22, such radial placement may be increased or decreased as desired or required, within the contemplation of this invention. It will be observed that whereas the shank portion of a conventional propeller rotates at a much lower rotational speed than the outer thrust portion of the blade, the axial movement of the blade through the air, as when mounted on aircraft is equal throughout all portions thereof. Accordingly, the flat surface of the leading fin 22 improves the braking effects of the propeller for conventional landing purposes without materially increasing the resistance of the entire blade to rotational movement or to axial movement when the blade is in full-feathered position.

Operation

While the operation of my invention is substantially evident from the above disclosure of the construction, further details are given relating thereto. The primary function of my improved shank for a propeller blade is to increase the rigidity of the propeller blade and thereby decrease undesirable flexion and vibration of the propeller blade during relatively high speed operation. Propeller vibrations create turbulence resulting in lost efficiency of the propeller blade and excess noise. As shown particularly in Figures 5 and 6, any force tending to flex the blade in any direction is opposed substantially by the lateral extent of one or more of the fins 22, 23, and 24. It will be observed that the lateral extent of each fin, including the core of the shank, is approximately equal in width to the entire diameter of the conventional cylindrical shank represented by the connector diameter. The rigidity of this web-type structure is well known and well understood so that further details and reference thereto are not believed necessary.

It will be realized that, although the lengths of the fins 22, 23, and 24 are substantially the same in this particular embodiment, they may be varied with respect to each other. It will be recognized that the exact lengthwise and lateral configurations of the fins are not necessarily limited to the disclosure provided such structure ultimately blends into the thrust portion of the blade 16 at approximately the same point where the normal cylindrical shank would blend into the thrust portion.

As shown in Figure 8, the inner end of the center line 25 of the core 21 is substantially coincident with the axis 20 of the entire propeller blade. The amount of this coincidence may be increased materially or decreased until it is little more than an intersection of the two axes, provided there is an angular relation between them.

Although a particular preferred embodiment of my invention has been described and disclosed herein, it will be understood that modifications thereof which lie within the scope of such disclosure are fully contemplated unless specifically stated to the contrary in the appended claims.

I claim:

1. A propeller comprising a central rotatable hub and a plurality of blades extending radially outwardly from the hub, each blade including an outer thrust portion and an inner shank portion extending between and connecting the thrust portion and the hub, the shank portion of each of the blades including an elongated core element and three fins substantially equi-angularly spaced about the core element and extending longitudinally of the latter, each fin, as measured in a transverse section through one point of the shank portion, having a width greater than its thickness and greater than the transverse dimension of the core element in such section, the three fins being of similar profile and substantially equal thickness in said section, one of the shank portion fins being co-planar with the thrust portion of the blade, and the other two fins of the shank portion progressively decreasing in width from said one point of the shank portion toward the thrust portion.

2. A propeller comprising a central rotatable hub and a plurality of blades extending outwardly from the hub on radial axes, each blade including an outer thrust portion and extending between and connecting the thrust portion and the hub, an inner shank portion, the shank portion of each of the blades including an elongated core element having an axis disposed at an angle to and intersecting the blade axis, each blade shank portion also including three fins distributed substantially equiangularly about the core element, each fin, as measured in a transverse section through the shank, having a width greater than its thickness and greater than the transverse dimension of the core element in such section.

3. A propeller comprising a central rotatable hub and a plurality of blades extending radially outwardly from the hub, each blade including an outer generally flat thrust portion and an inner shank portion extending between and connecting the thrust portion and the hub, shank portion of each of the blades including an elongated core element and three fins substantially equiangularly spaced about the core element and extending longitudinally of the latter, one of the fins of each blade being substantially continuous with and disposed in the plane of the thrust portion, said one fin and the thrust portion of the corresponding blade having side faces merging smoothly into one another, each fin as measured in a transverse section through the shank and at a point of the latter closer to the hub than to the thrust portion having a width greater than its thickness and greater than the transverse dimension of the core element in such section, and the fins being of substantially equal thickness at said section.

4. A propeller comprising a central rotatable hub and a plurality of blades extending radially outwardly from the hub, each blade including an outer thrust portion and an inner shank portion extending between and connecting the thrust portion and the hub, the shank portion of each of the blades including an elongated core element and three fins substantially equi-angularly spaced about the core element and extending longitudinally of the latter, the widths of the fins of each blade as measured at a point of the shank portion remote from the thrust portion and in a plane transverse to the axis of the corresponding blade being substantially equal to one another and greater than their respective thicknesses, the width of two of the fins progressively decreasing and the width of the third fin progressively increasing from such point to the thrust portion, and said third fin merging into the outer thrust portion of the blade.

5. A propeller comprising a central rotatable hub and a plurality of similar blades extending outwardly from the hub on radial axes, each blade including an outer thrust portion and, extending between and connecting the thrust portion and the hub, an inner shank portion, the shank portion of each of the blades having a part comprising three equiangularly spaced fins extending longitudinally of the blade and disposed in intersecting relation and a part comprising a connector having a surface of revolution substantially symmetrical about the blade axis, the hub being formed with radial sockets which receive the connector parts of the blades, the finned part of each blade shank portion also including a central core element extending longitudinally of the blade at the intersection of the fins and of generally less cross sectional area than the connector part, the core element including a tapered base end of progressively increasing cross sectional area toward the connector part, each fin being integral with and extending onto the tapered base end of the core element, and each fin as measured in a transverse section through the shank having a width greater than its thickness and greater than the transverse dimension of the core element in such section.

6. A propeller comprising a central rotatable hub and a plurality of similar blades extending outwardly from the hub on radial axes, each blade including an outer generally flat thrust portion and extending between and connecting the thrust portion and the hub, an inner shank portion, the shank portion of each of the blades having a part comprising three equiangularly spaced fins extending longitudinally of the blade and a part comprising a connector having a surface of revolution substantially symmetrical about the blade axis, the hub being formed with radial sockets which receive the connector parts of the blades, the finned part of each shank portion also including a central core element extending longitudinally of the blade and of generally less cross sectional area than the connector part, the core element being tapered and of progressively increasing cross sectional area toward the connector part, one of the fins of each blade being substantially continuous with and disposed in the plane of the thrust portion, said one fin and the thrust portion of the corresponding blade having side faces merging smoothly into one another, and each fin as measured in a transverse section through one point of the shank having a width greater than its thickness and greater than the transverse dimension of the core element in such section.

7. A propeller comprising a central rotatable hub and a plurality of blades extending outwardly from the hub on radial axes, each blade including an outer generally flat thrust portion and, extending between and connecting the thrust portion and the hub, an inner shank portion, the shank portion of each of the blades including an elongated core element having an axis disposed at an angle to and intersecting the blade axis in the plane of the thrust portion, each blade shank portion also including three fins distributed substantially equiangularly about the core element in intersecting relation, one of the fins of each blade being substantially continuous with and disposed in the plane of the thrust portion, said one fin and the thrust portion of the corresponding blade having side faces merging smoothly into one another, each fin as measured in a transverse section through one point of the shank having a width greater than its thickness and greater than the transverse dimension of the core element in such section, and the fins being of similar profile and substantially equal thickness at said section.

8. A propeller comprising a central rotatable hub and a plurality of blades extending outwardly from the hub on radial axes, each blade including an outer generally flat thrust portion having leading and trailing edges and an inner shank portion extending between and connecting the thrust portion and the hub, the shank portion of each of the blades including an elongated core element having an axis disposed at an angle to and intersecting the blade axis in the plane of the thrust portion, each blade shank portion also including three fins distributed substantially equiangularly about the core element in intersecting relation, one of the fins of each blade being substantially continuous with and disposed in the plane of the thrust portion, said one fin having an edge continuous with the leading edge of the thrust portion of the corresponding blade, the other two fins of such blade forming a V-shaped bracing element merging into the trailing edge of the thrust portion of such blade, each fin as measured in a transverse section through one point of the shank having a width greater than its thickness and greater than the transverse dimension of the core element in such section, and the fins being of similar profile and substantially equal thickness at said section.

References Cited in the file of this patent

UNITED STATES PATENTS

| | | |
|---|---|---|
| 1,427,307 | Ma Kenny | Aug. 29, 1922 |
| 1,532,346 | Roberts | Apr. 7, 1925 |
| 2,001,896 | Ward | May 21, 1935 |
| 2,161,932 | Peterson | June 13, 1939 |
| 2,514,487 | Griese | July 11, 1950 |

FOREIGN PATENTS

| | | |
|---|---|---|
| 595,288 | France | Sept. 30, 1925 |